July 26, 1938.  J. C. KARNES  2,124,575
ACOUSTIC DEVICE
Filed Oct. 30, 1934
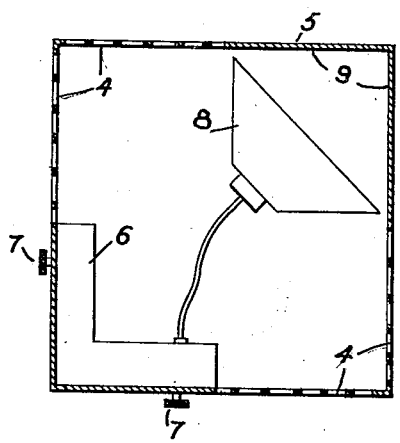
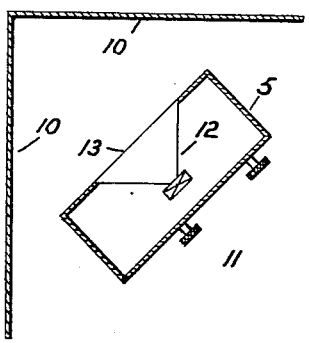
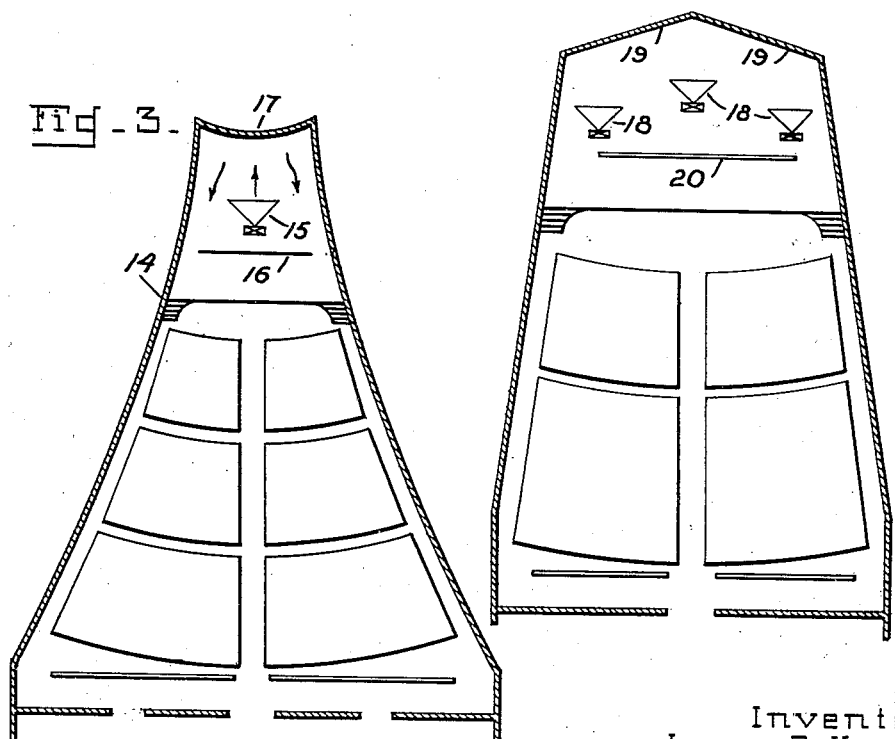
Inventor
James C. Karnes
By W. N. Roach
Attorney Patented July 26, 1938

2,124,575

UNITED STATES PATENT OFFICE 2,124,575

ACOUSTIC DEVICE

James C. Karnes, Buffalo, N. Y.

Application October 30, 1934, Serial No. 750,678

5 Claims. (Cl. 181—31)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an acoustic device.

The purpose of the invention is to provide uniform diffusion of sound through a chamber to eliminate directional effect of a horn axis through a chamber and at the same time to suppress undesirable tones such as static noises and background hum.

In sound transmission and radiation, undesirable tones are generally in the nature of weak disturbances whose recurrence results in interference with the proper reception of the desired tones. I have discovered that the undesired tones, being weak, do not survive reflection and are absorbed or eliminated. The similar absorption of the desired tones is easily compensated for by increase in volume.

The purpose of the invention is accomplished by having the sound waves emanate from a source in a direction other than their ultimate direction of travel toward the area of reception and then reflecting them by suitable baffles into the ultimate direction of travel. The reflection, in addition to eliminating undesirable tones, produces a change or reversal of the path of travel of the sound waves and effectively insures diffusion of the sound throughout the chamber.

The invention is illustrated more or less schematically in the following drawing, in which, Fig. 1 is a transverse sectional view of the improved device showing the sound radiator and baffle in connected relation.

Fig. 2 is a similar view showing these members in disconnected but associated relation.

Figs. 3 and 4 are similar views showing the application of the invention to large chambers.

Referring to Fig. 1, there is shown a container or instrument 5 equipped with a source of sound indicated at 6, controls 7 and a sound radiator 8 which is in the form of a horn.

A baffle 9 for reflecting sound is spaced from the mouth of the sound radiator 8 and has a directional axis that differs from and is preferably opposite to the directional axis of the sound radiator. The baffle is part of the container, preferably one corner thereof, and is therefore in connected relation with the sound radiator. The wall or walls of the container or cabinet which are not required to establish the baffle are provided with sound emergent openings 4.

In Fig. 2 the baffle 10 is formed by the wall of a room or chamber 11 and is not connected with the sound radiator 12 whose mouth 13 is in the rear wall of the instrument.

In Fig. 3 there is shown a large auditorium or chamber 14 which is in the form of a horn, preferably one having an exponental variation in cross-section with the length. A source of sound which may or may not include a sound radiator 15 is placed in rear of a screen 16 and is directed towards the small end or throat of the chamber in which is placed a baffle 17. Sound emanating from the horn is reflected by the baffle before traveling to the main part of the chamber. This arrangement may also be used on a smaller scale where the chamber 14 represents the container.

The same principle is illustrated in Fig. 4 in which a plurality of sound radiators 18—18 are directed towards baffles 19—19 at one end of the chamber in rear of the screen 20.

This structure and arrangement increases the length of the path of travel of the sound but this is a decided advantage because the intensity of a sound wave diminishes according to distance from the source and the volume over a given area in the path of the wave will be more nearly equal the greater the distance from the source. This condition obtains because the depth of the given area is proportionally related to the distance of the sound path from its source.

I claim:

1. In an acoustic device to be positioned in spaced relation to the wall of a room or similar structure, a container having a side which is designed to be the front presented to a listener and a side which is normally the rear presented to the wall of the room, a source of sound in the container and a sound radiator including a horn having its axis directed to the rear side and having its mouth in the rear side whereby sound emanating from the radiator is adapted to be directed against the wall of the room.

2. In an acoustic device, a container comprising enclosing walls, the inside of the walls of one corner of the container being planar and constituting a sound diffusing baffle, a sound radiator including a horn within the container and having its axis directed towards the corner constituting the baffle whereby sound waves delivered against the baffle are reflected uniformly with respect to the sound radiator, and the portion of the container enclosing the sound radiator having sound emergent openings.

3. An acoustic device comprising converging and meeting planar sound-diffusing baffles and a sound radiator including a horn having its axis directed towards the inside meeting line of the converging baffles whereby sound waves delivered against the baffle are reflected uniformly with respect to the sound radiator.

4. An acoustic device comprising a walled container having the inside of a portion of its wall constituting a planar sound-diffusing baffle, a sound radiator including a horn within the container and arranged to deliver sound waves only against the baffle whereby the sound waves are reflected by the baffle uniformly with respect to the sound radiator, and the portion of the wall enclosing the sound radiator having sound emergent openings.

5. An acoustic device comprising a planar sound-diffusing baffle and a sound radiator including a horn arranged to deliver sound waves only against the baffle whereby the sound waves are reflected by the baffle uniformly with respect to the sound radiator.

JAMES C. KARNES.